US011526631B2

(12) United States Patent
Lowagie

(10) Patent No.: US 11,526,631 B2
(45) Date of Patent: Dec. 13, 2022

(54) DISTRIBUTED BLOCKCHAIN-BASED METHOD FOR MAINTAINING THE VALIDITY OF A FILE

(71) Applicant: ITEXT GROUP NV, Gentbrugge (BE)

(72) Inventor: Bruno Lowagie, Sint-Amandsberg (BE)

(73) Assignee: ITEXT GROUP NV, Gentbrugge (BE)

( * ) Notice: Subject to any disclaimer, the term of this patent is extended or adjusted under 35 U.S.C. 154(b) by 142 days.

(21) Appl. No.: 16/473,107

(22) PCT Filed: Dec. 14, 2017

(86) PCT No.: PCT/EP2017/082803
§ 371 (c)(1),
(2) Date: Jun. 24, 2019

(87) PCT Pub. No.: WO2018/114587
PCT Pub. Date: Jun. 28, 2018

(65) Prior Publication Data
US 2019/0347444 A1    Nov. 14, 2019

(30) Foreign Application Priority Data

| Dec. 22, 2016 | (BE) | ................................ 2016/5964 |
| Dec. 22, 2016 | (BE) | ................................ 2016/5965 |
| Dec. 22, 2016 | (BE) | ................................ 2016/5966 |
| Oct. 25, 2017 | (WO) | ................. PCT/IB2017/056624 |

(51) Int. Cl.
| *H04L 9/06* | (2006.01) |
| *H04L 9/30* | (2006.01) |
| *H04L 9/08* | (2006.01) |
| *H04L 9/32* | (2006.01) |
| *G06F 21/60* | (2013.01) |
| *G06F 21/64* | (2013.01) |
| *G06F 16/14* | (2019.01) |
| *G06F 21/31* | (2013.01) |
| *H04L 9/00* | (2022.01) |

(52) U.S. Cl.
CPC ............ *G06F 21/64* (2013.01); *G06F 16/152* (2019.01); *G06F 21/31* (2013.01); *G06F 21/602* (2013.01); *G06F 21/645* (2013.01); *H04L 9/0637* (2013.01); *H04L 9/0643* (2013.01); *H04L 9/0891* (2013.01); *H04L 9/3073* (2013.01); *H04L 9/3236* (2013.01); *H04L 9/3247* (2013.01); *H04L 9/3263* (2013.01); *H04L 9/50* (2022.05)

(58) Field of Classification Search
CPC ........ G06F 21/64; G06F 16/152; G06F 21/31; G06F 21/602; G06F 21/645; H04L 9/0637; H04L 9/0643; H04L 9/0891; H04L 9/3073; H04L 9/3236; H04L 9/3247; H04L 9/3263
USPC ........................................................ 713/193
See application file for complete search history.

(56) References Cited

U.S. PATENT DOCUMENTS

| 5,465,299 | A | * | 11/1995 | Matsumoto | .......... G06Q 50/188 380/30 |
| 6,584,565 | B1 | | 6/2003 | Zamek | |
| 8,560,853 | B2 | | 10/2013 | De Mello | |
| 10,530,586 | B2 | * | 1/2020 | Meriac | ................... H04L 9/3297 |
| 2013/0226810 | A1 | | 8/2013 | Moffett | |
| 2014/0379585 | A1 | | 12/2014 | Buelloni | |
| 2016/0212146 | A1 | | 7/2016 | Wilson | |
| 2016/0330027 | A1 | * | 11/2016 | Ebrahimi | ............... G06Q 20/02 |
| 2017/0126642 | A1 | * | 5/2017 | Basin | .................... H04L 9/3226 |
| 2018/0034646 | A1 | * | 2/2018 | Kuramoto | ............. H04L 9/3268 |
| 2018/0083771 | A1 | * | 3/2018 | Bonnell | ................ H04L 9/3239 |
| 2018/0101848 | A1 | * | 4/2018 | Castagna | ............ H04L 63/0407 |

FOREIGN PATENT DOCUMENTS

WO    2016179334 A1    11/2016

\* cited by examiner

*Primary Examiner* — Kambiz Zand
*Assistant Examiner* — Phuc Pham
(74) *Attorney, Agent, or Firm* — Cermak Nakajima & McGowan LLP; James Creighton Wray

(57) ABSTRACT

This application claims the benefit of Belgian Application No. BE2016/5964 filed 22 Dec. 2016, Belgian Application No. BE2016/5965 filed 22 Dec. 2016, Belgian Application No. BE2016/5966 filed 22 Dec. 2016, PCT/IB2017/056624 filed 25 Oct. 2017 and PCT/EP2017/082803 filed Dec. 14, 2017, International Publication No. WO 2018/114587 A1, which are hereby incorporated by reference in their entirety as if fully set forth herein.

19 Claims, No Drawings

DISTRIBUTED BLOCKCHAIN-BASED METHOD FOR MAINTAINING THE VALIDITY OF A FILE

TECHNICAL DOMAIN

The invention relates to the technical domain of maintaining the validity of digitally signed data such as files.

STATE OF THE ART

All digital signatures belonging to data such as files are subject to a limited validity. As a result, it is necessary that the validity of the data is provided with renewed signatures, for not losing its validity. A problem with the known methods for maintaining the validity of files is that it requires a central authority for maintaining it. Another problem is that the maintenance becomes problematic when the original publisher of the file is no long available. As a result, the user depends too much on this publisher.

U.S. Pat. No. 5,465,299 discloses related methods and systems, but does not disclose means for maintaining the validity of a file.

US 2016/0330027 discloses related methods and systems. US 2016/0330027 however lacks means for handling files.

U.S. Pat. No. 6,584,565 discloses a concept allowing to extend the period during which a digital signature can be verified till after expiry of any or all the certificates of which this signature depends. An approach "save state" is described, in which a filing facility is used for saving public key infrastructure (PKI), e.g. cryptographic information, such as certificates and certification revocation lists (CRLs), in addition to non-cryptographic information, such as trust policy statements, or the document itself. This information comprises everything it needs for again going through the verification process of the signature at a later point in time. When a user wants to check the signature on a document again, possibly years later, then a long-term signature verification (LTSV) server re-creates the precise condition of the PKI at the moment when the document was originally filed. The LTSV server restores the state, and the signature verification process carries out exactly the same process than it would have carried out at that time.

A problem with a method according to U.S. Pat. No. 6,584,565 is that no mechanisms are provided for avoiding a central authority (in this case, at least an LTSV server). Also, no flexibility is provided as to the order of signing. Furthermore, a concept according to U.S. Pat. No. 8,560,853 is not adapted to the specific nature of for example PDF documents.

US 2016/0212146 describes systems and methods using a blockchain for recording a file date and for avoiding manipulation, even for documents that are secret and also for those stored in uncontrolled environments. These systems and methods do not require that any confidence is placed in a timestamping authority or a document filing service. A trusted timestamping authority can be used, but even when this timestamping authority loses its credibility or when a third party refuses to recognize the validity of a time stamp, a date for an electronic document can still be specified.

A disadvantage of a method according to US 2016/0212146 is the lack of a mechanism for long-term verification of files.

US 2013/0226810 discloses a system for certifying the state of a will with a security adapted to be attached to a will. A server provides an account reference number and a version identification. The version identification corresponds to a version of a will to which the security device is attached. The security device comprises information which comprises at least one of the account number and the version identification.

A problem with a system according to US 2013/0226810 is that is it based on the use of a central server. Moreover, the concept is limited to a single type of data, namely a will.

The present invention aims to find a solution for at least some of the above-mentioned problems.

There is a need for an improved method for maintaining the validity of files, in which there is no need for a central authority ensuring this maintenance. Moreover, it is important for the user not to depend from the publisher of a file or of a central authority for being able to maintain the validity of the file.

SUMMARY OF THE INVENTION

In a first aspect, the invention relates to a computer-implemented method for maintaining the validity of a file by two users, that are a receiver and a validating instance, said method comprising the sequential realization of the following set of steps for each of said plurality of users:
 (a) providing said file to the user;
 (b) searching a publisher-related file signature in a blockchain, said publisher-related file signature belonging to said file;
 (c) confirming a validity of said publisher-related file signature;
 (d) determining an identification string belonging to said file based on said file and/or optionally based on said publisher-related file signature;
 (e) establishing a renewed file signature based on at least both said identification string belonging to said file and a private key belonging to the user;
 (f) registering said renewed file signature in said blockchain;
in which said publisher-related file signature comprises a publisher identity belonging to a publisher; in which said publisher is different of each of said two users; in which said confirming of the validity in step (c) comprises determining the validity of said publisher identity; in which said renewed file signature at least allows to identify said file in a unique way with respect to the blockchain; in which said establishing in step (e) comprises encrypting said identification string by means of said private key belonging to a pair key belonging to said user for obtaining a signed identification string, said key pair comprising said private key and a public key; in which said renewed file signature comprises said signed identification string; in which said renewed file signature comprises a user identity for finding said public key; and in which said maintaining is as soon as step (f) has been carried out for each user.

Two main advantages of such a method are the decentralized character of each file signature, and the fact that the validating instance also maintaining the validity, may be different from the publisher of the file.

Thanks to the decentralized character, the file signature can be considered as a decentralized signed file. In this way, the user does no longer depend on a central authority for signing or renewing the signature of the file. The present invention is hereby based on a blockchain, a proven technology allowing irreversible, incontestable and distributed recording of the file and its signature, in which it is typical for the operation of the blockchain that this distributed recording is also provided with a non-adaptable and incontestable time stamp. This contrasts with a method of the state of the art, in which at least one of these aspects either is not treated or is treated according to a centralized model.

Thanks to the fact that the publisher and the validating instance may differ, the invention offers a solution for the problem in which a receiver of a file cannot renew the signature proving the validity of his/her file because the publisher of the file is not available for renewing it. This is for example the case when a publisher no longer exists. In a method of the state of the art, the signatures belonging to the file cannot be renewed any more, as a result of which the file loses its validity. In a method of the present invention, this is possible because a reliable validating instance, such as for example an authority, takes the role of the publisher.

An additional advantage of the invention lies in its advantageous avoidance of registering personal information in the blockchain. Since only identifiers of the document, and not the actual contents of the document is stored in the blockchain, there is no risk of having the contents disclosed when, for instance, a security-related algorithm is outdated and/or hacked. This is important particularly in view of the General Data Protection Regulation (GDPR) (Regulation (EU) 2016/679) which requires that, upon request of a citizen, personal information is removed. In view of the GDPR, direct registration of personal information in the blockchain should be avoided, since such registration cannot be removed afterwards.

In a preferred embodiment, said sequential realization of said set of steps for a first of said two users comprises a trigger for sequentially carrying out said set of steps for a second of said two users. This clearly contrasts to the case in which the signing is carried out essentially independently, with as the only link that the realization is carried out as soon as both users have gone through step (f). In a preferred embodiment, a first of said two users does however go through all steps (a) to (f), and the registration in step (f) preferably leads to the generation of a notification at the second of said two users. This notification can for example be transferred via contact details that are linked to the user identity, whether or not linked to a collective registration in a web-of-trust and/or with a Certificate Authority. After receipt of said notification, the second of said two users can go through steps (a) to (f), after which the validity of the file has been renewed.

In a preferred embodiment, said registration in step (f) is realized provided that said user identity belonging to said user and said user identity belonging to said validating instance, belong to a plurality of user identities that have been registered in a web-of-trust and/or with a Certificate Authority. This allows to guarantee the authority of the receiver and in particular of the validating instance. In a further preferred embodiment, said registration in step (f) is realized further provided that said user identity belonging to said validating instance meet the additional criterion as to reliability. An appropriate criterion as to reliability typically attaches conditions to several factors simultaneously. In one embodiment with a web-of-trust, a validating instance must be involved within said web-of-trust in a number of earlier file signatures larger than a predefined first number, e.g. 10, linked to a number of user identities of receiver larger than a predefined second number, e.g. 5. As said first and second number are chosen larger, the additional criterion as to reliability becomes more stringent. In an embodiment with a Certificate Authority, the Certificate Authority must comply with certain quality standards and criteria as known to the skilled person, and the validating instance must be able to prove its registration with said Certificate Authority.

Another advantage of the present invention is the decentralized approach of signing, with provisions for non-repudiation. The signing of the file comprises the application of Public Key Infrastructure (PKI). Because the user, i.e. both the user and the validating instance, encrypts the identification string with his/her own private key, a third party to whom the encrypted hash is unlimitedly available, can verify by means of the unlimitedly available public key if nobody else than said user has encrypted the particular hash. A signature with the private key can thus be reduced to an action of the owner of that private key, which is important when realizing non-repudiation.

Another advantage of the invention is that there can never be a conflict amongst the users as to the content of the file. Each file is indeed identified by an identification string for which it has been specified that it is unique with respect to the blockchain. In a preferred embodiment, this uniqueness is guaranteed using a hash function and/or using a document-ID-pair. The use of a document-ID-pair is preferably combined with an embodiment in which the file is a PDF document or a PDF-based document, but this does not necessarily have to be the case. In an alternative embodiment, the file is not a PDF document or PDF-based document, and the file nevertheless contains the document-ID-pair, preferably in the metadata and/or file characteristics of the file. Thus, the invention offers a solution for the problem that, after the collective signing, a party can claim that the file that he has received, had an adapted content with respect to the version that the other parties have received. In a preferred embodiment, it is guaranteed by means of explicit provisions that the identification string is unique with respect to the blockchain. It can for example be about sub-steps in which the document-ID-pair is adapted iteratively until both the hash and the document-ID-pair are unique with respect to the blockchain, if exceptionally it would seem that the hash is not unique with respect to the blockchain.

In a preferred embodiment, said determination in step (b) comprises the calculation of a hash from said file by means of a cryptographic hash function, in which said identification string is determined based on at least said hash. In a further embodiment, the identification string comprises said hash. This has the advantage that the user himself can verify if the unique identification string and the file effectively belong together. Indeed, the hash forms a "finger print" of the file. Each user can thus himself apply the cryptographic hash function to the file, and can verify if the obtained hash corresponds to the hash that is present in the unique identification string. In this way, the invention offers a solution for the problem in which a receiver of a file does see that the unique identification string is unique with respect to the blockchain, but cannot verify if the link between this identification string and the file is correct. Note that hereby, it is not important if the content of the form is confidential or accessible for the public, as in the method, no portions of the actual file are registered in the blockchain.

Another advantage of the method of the present invention is that there is no need for a Timestamp Authority (TSA) controlling the attribution of time stamps, which is typically the case in a method of the state of the art. The use of such a TSA is thus unnecessarily complex. Related thereto, in several embodiments of the present invention, there is also no need for a Certificate Authority (CA) controlling authorship or validating identity. The use of such a CA may in several cases be unnecessarily complex.

Another advantage of the present invention is that the blockchain realizes in this way a user-friendly and transparent inventory of signed files. First, a simple search for files signed by a particular user can immediately provide a whole list of signatures to anyone having access to the blockchain. Furthermore, in an embodiment in which the non-encrypted (or, equivalent, non-signed) hash has been included in the file signature, a search can also very simply be carried out for this hash, in order to find out if the file has been registered, and if there aren't any problems with it, such as for example in case several signatures are present in the blockchain that do not logically relate.

Another advantage of the present invention is that file signatures are collectively available, so that anyone having access to the blockchain, can see details about the used type of hash function and/or PKI encryption and/or technique for signing. If a particular technique is known not to be considered as trustworthy any more, large groups of users can immediately be informed about it, and by extension, they can be encouraged to "renew" the signature of their existing files by means of another, more secure technique. It can also be easily verified of this "renewal" is actually carried out. Such a large-scale problem identification is inconceivable in a case in which electronic signatures are sent together with the actual file.

In a second aspect, the invention relates to a system for maintaining the validity of a file by a plurality of users, said system comprising a plurality of mutually linked devices, each of the devices comprising a processor, tangible non-volatile memory, instructions in said memory for controlling said processor, a client application, in which for each device, the client application is configured for carrying out a method according to the present invention, in which a user identity for retrieving a public key for at least one of the users is linked one-to-one to the client application on the device belonging to said user.

Such a system has the advantage that a more controllable environment can be created, allowing to take fast action in diverse situations, such as the case of a compromised HSM.

In a third aspect, the invention relates to a use of the method of the present invention in a system of the present invention.

In a fourth aspect, the invention relates to a computer program product for carrying out a computer-implemented method for maintaining the validity of a file by a plurality of users according to the present invention, which computer program product comprises at least one readable medium in which computer-readable program code portions are saved, which program code portions comprise instructions for carrying out said method.

Further preferred embodiments of the present invention will be described in the detailed description and the claims.

DETAILED DESCRIPTION

When maintaining the validity of a file according to the present invention, various aspects are important. Assuming a successful earlier registration and signing of the file in the blockchain, amongst other things three causes can necessitate the renewal of the signature.

(01) The hash function has expired since the earlier signature. In a preferred embodiment, the identification string comprises a hash that is calculated based on said file by means of this hash function. This hash function expires as soon as it is compromised, for example because a method has been found for having more than one file correspond with the same hash (hash collision). In such a case, the hash function cannot fulfil its original role anymore, because it allows someone to modify a file without having to modify the hash or identification string of the file. In this way, one can make it seem like that a file which has been modified at a later point in time, already contained the modifications at an earlier point in time. Re-registration of the same file in the blockchain by means of a better hash function offers a solution for this problem.

(02) The registration of the user identity of one or more users in the web-of-trust and/or with the Certificate Authority has expired since the earlier signature. This is also solved in a plurality of embodiments of the present invention. Both the web-of-trust and the Certificate Authority indeed allow to verify if the user identity was valid at the time of the earlier signature. In a preferred embodiment, the web-of-trust is moreover specified in the blockchain. And since the blockchain cannot be adapted, one can rely on these older data to be sure that the user identity can be registered again, and that also all file signatures signed by the user identity can be renewed.

(03) The way in which one or more users have signed the file with their private key has become unreliable since the earlier signature. On the one hand, this is due to the algorithm that has been used hereby. On the other hand, this can relate to the key itself, for example because it is not considered as sufficient anymore because of the development of new methods and/or increasing calculation force and/or because the private key was stolen. In the latter case, the user may revoke the private key from the web-of-trust and generate a new key pair. Hereby, revocation may give rise to doubt with respect to the authenticity of the original key pair and the related signatures. In a preferred embodiment in which the web-of-trust is specified in a blockchain, one can go back to the earlier signature to the moment when the algorithm and the key length were still reliable at the moment of recording the earlier signature. The blockchain indeed ensures that the recording cannot be adapted.

Each of said causes (01), (02) and (03) can be a reason to carry out the method of the present invention, for maintaining the validity of the file. According to a preferred embodiment, a new signature of both the receiver and the validating instance must be registered for renewing the file signature. This is useful because it realized an increased security thanks to a proof of confidence by more than one party. This is in line with the principle underlying the web-of-trust and/or the Certificate Authority.

In an alternative embodiment, it is not necessary that both the receiver and the validating instance register a new signature for maintaining the validity of the file, and it is enough that at least one of both users registers a new signature. In theory, this always leads to a reduced security, but in particular in case of cause (01), the reduction of security is limited. Also in case of cause (02) and (03), an embodiment in which only at least one of the users registers, is possible. In case of cause (01), it can be sufficient in an alternative embodiment that one of both users, for example the receiver (since that is the one who typically has most interest in maintaining the validity), derives a new hash from the file with a new hash function, and registers it in the blockchain. This registration thus leads to a renewed registration. In case of cause (01), it is indeed possible for anyone to check afterwards if a file meets both the previously registered hash (that has become insecure) and the (more secure) hash that has been registered later. But even in this case, a security risk is not inconceivable. For example, after expiry of the original hash function with resulting first hash (that has become insecure), a user could draw up an adapted file that exactly meets the same first hash (that has become insecure). For this adapted file, the user could subsequently calculate the new hash and correspondingly register with a file signature in the blockchain. Both in an embodiment in which both users sign as in an embodiment in which only at least one user signs, this can be important. It is indeed conceivable that the receiver makes the modification. And since the validating instance does not have to be the publisher, it is possible that the latter does not dispose of the original file, but on the contrary, receives an adapted version of the receiver, of which the receiver claims that it is the original file. Based on only the original hash and the new adapted hash, the validating instance cannot reveal this adaptation. Therefore, in a preferred embodiment, the identification string comprises one or more supplementary hashes that have been calculated with one or more supplementary hash function that differ from said hash function. This allows to increase the confidentiality, and to counter the impact of the expiry of the hash function. This is indeed very improbable that several different hash functions expire simultaneously. Therefore, when using several hash functions, mostly at least one hash function will not be expired, allowing to still notice any modification. Only when all used hash functions have already expired at the moment when renewal is necessary, it is hypothetically still possible that an improper modification of the original document still takes place. The latter does however require that the improper modification does not have an impact on any of the hashes, which is very improbable.

The invention relates to a "file", that is a digital file relating to one or more interested parties, in which it is for at least one of these interested parties important that the validity and/or correctness and/or value of said digital file, either directly or indirectly, is maintained on the long term. Said digital file can be saved in any format, and can but does not necessarily have to be appropriate for printing on paper. It can thus be a format for word processing or word display, but it can also be an image (either pixel based, or vector based), a media file such as an audio fragment or a film fragment, or a specialized file format such as e.g. a computer aided design (CAD) file. An example of a possible file format is "PDF", the "Portable Document Format" file format. Another example is a PDF-based document, a category that comprises all PDF documents, but also all other files comprising portions of code relating to the PDF standard. Below, you will find a non-limiting list of examples. A first example of a PDF-based document is a PDF document. A second example is a PDF portfolio, a container format that is appropriate for comprising several PDF files and related data. A third example is an XFA file (XML Forms Architecture), a mark-up language in which a dynamic form is made in XML (eXtensible Markup Language), but in which the XML code is compressed and saved in a PDF file. Such a XFA file can be processed by PDF processors supporting the XFA specification. A fourth example is a successor or variant to the present PDF file format, of which the aim is similar to that of the present PDF file format.

In the context of the present document, a user ensures the "signing" and "registering" of a file signature belonging to the file. The "author" of the document is the person or entity who has written the document and/or to whom the document belongs. The "publisher" of the file is the person who has registered the document in the blockchain in the past, whether or not in consultation with the receiver, and can, but does not have to coincide with the author of the file. The "receiver" of the file is the person to whom the file and/or the content of the file relates, or at least who has in one or the other way interest in maintaining the validity of the file. The validating instance is a party monitoring the maintenance of said file, and can be different from the publisher, although the validating instance and the publisher can be the same party. Both the receiver and the validating instance are "users" in the context of the present document. It will be clear that it comprises a multitude of embodiments of the present invention, and that the publisher and the users can be persons, but that they each can also be companies. It is also possible that, at the moment of signing by the publisher, the receiver relates to another party than the receiver when maintaining the file. Furthermore, the author need not be or represent a physical person, and may as well be a machine, e.g. a computer running an appropriate automated algorithm.

In a preferred embodiment, the publisher-related file signature is the file signature that is effectively applied by the "original publisher" himself, i.e., the publisher who made the first registration of the file in the blockchain. In an alternative embodiment, the role of "publisher" is transferred from renewal to renewal. At a second of later renewal, the "publisher" is either the original publisher at the first registration, or the validating instance acting at an earlier renewal. In the present document, this role is however referred to with the term "publisher", while the term "validating instance" refers to the user acting at the present renewal.

In the present document, the term "hash" refers to a second bit string, an output string, that is obtained by having a cryptographic hash function act upon a file, corresponding to a first bit string, as input string. The terms "hash function" and "hashing algorithm" are hereby equivalent. For being significant, this hash function must convert the long first bit string into a (much) shorter second bit string. Furthermore, the chance that the hash already figures as a hash of another file, must be very low, so that the hash can be a useful form of unique "finger print" of the file. This "finger print" is usually referred to with the term "message digest". It should also be impossible to reconstruct portions of the original file from the obtained hash, i.e. the hash function should be "one-way". In a preferred embodiment, the cryptographic hash function is thus a function meeting all of these criteria, such as an algorithm belonging to the family of Secure-Hash-Algorithms (SHA), more preferably SHA-256. Hereby, it should be noted that the possibility of a non-unique hash cannot be excluded theoretically; when two non-identical files correspond to the same hash after separate application of the same hash function, this is called a "hash collision". This is to be distinguished from the case where two documents are completely identical, i.e. with contents including file identifier identical. This leads to identical hashes but is not typically referred to as hash collision. In a preferred embodiment of the present invention, the invention comprises provisions for taking into account the possibility of identical hashes, whether caused by hash collision or not, for example by using a supplementary hash and/or using a document-ID-pair.

In the present document, the terms "public key" and "private key" refer to aspects of Public Key Infrastructure (PKI). PKI is used for recording the identity of a person or organization. PKI comprises the use of a key pair comprising two keys:

a private key that must be kept secret by the owner of the private key. This private key is typically saved on a Hardware Security Module (HSM) and/or smart card and/or USB token and/or similar device of which it cannot be retrieved;

a public key that can be shared with the world, and comprises information about the owner.

The private key can never be retrieved based on the public key, they form a pair because a message that has been encrypted with the one key can only be decrypted by means of the other key. In the context of the present invention, such a key pair is used for signing a hash. By signing the hash with the private key, it is possible for a receiver of the encrypted hash to retrieve the original hash, by using the public key, which, in a method of the present invention, can be retrieved based on the user identity. If such decryption is successful, nobody else than the owner of the private key can encrypt the hash. In this way, the receiver is thus certain of the origin of the encrypted hash.

In the context of the present document, the terms "document reference", "document signature" and "file signature" are used interchangeably. The terms "file" and "document" are also used interchangeably. Likewise, the term "file ID pair" and "document ID pair" are interchangeable. Hence, the term "document" should never be interpreted as limiting the invention to files that adhere to some narrow interpretation of the term "document", and hence always refers to "files" in the broadest sense of that word, being a string of binary digits adapted to be stored on electronic means or exchanged on a digital electronic network.

In the document, the term "blockchain" refers to a distributed database keeping a continuously growing list of registrations in blocks, which are specified incontestably, are kept up to date and cannot be adapted. Hereby, it is immaterial which variant of blockchain is intended, and all distributed ledger technology (DLT) may serve as the blockchain mentioned in claim 1. Moreover, in a preferred method, the present invention is agnostic with respect to the specific blockchain used, and may be applied to any of a wide range of blockchain types without requiring alteration. In a preferred embodiment, the use of multiple blockchain types is possible concurrently, with e.g. a system that has access to multiple blockchains and registers a file A in blockchain A for user A while registering a file B in blockchain B for user B. Related, the term "blockchain" and "distributed ledger technology" are used interchangeably in this document. This includes all common types of blockchains and related ledgers known to the skilled person. Hereby, it may concern a permissionless or permissioned blockchain, a public or private blockchain, a blockchain with centralized, decentralized, or distributed ledger control. The consensus mechanism involved in the adding of data to the blockchain preferably concerns distributed consensus. This may involve proof-of-work but may also and/or alternatively involve any of the following: proof-of-stake, a leader-based system, a voting-based system or a principle based on hashgraph.

In a preferred embodiment, without limiting the scope of the invention, the blockchain, as distributed ledger technology, fulfils following conditions:

The records can be replicated over multiple nodes in a network (decentralized environment).

New records can be added by each node, upon consensus reached by other nodes (ranging from one specific authoritative node to potentially every node).

Existing records can be validated for integrity, authenticity, and non-repudiation.

Existing records can't be removed, nor can their order be changed.

The different nodes can act as independent participants that don't necessarily need to trust each other.

Hereby, a node is a connection point in a distributed network that can receive, create, store or send data from and to other nodes in that network; a ledger is a collection of permanent, final, definitive records of transactions; and a ledger record is an entry in the ledger containing information about one or more transactions. As for instance permissioned ledgers equally fall within the scope of the present invention, alternative embodiments exist for which one of more of the above conditions are not fulfilled and/or are replaced by different additional conditions.

Accordingly, in this document, the blockchain refers to any such distributed database based on consensus, such as the bitcoin blockchain. In the context of the present document, the registrations relate to file signatures; in the known case of bitcoin, the registrations relate for example to transactions. The database is saved and maintained at a multitude of nodes, that each separately take part in the calculations that are necessary for expanding the list of registrations. It is inherent to the design of the blockchain that none of the nodes make adaptations to the existing list of registrations, that, when recording, a time or "time stamp" is associated to each of the registrations. Strictly speaking, these adaptations are possible, but only provided that some condition is fulfilled, e.g. when a majority of the calculation represented force in the nodes "conspires", which becomes more improbable as the blockchain gets larger and knows more users. Because of the advantageous characteristics, a blockchain can serve as "distributed ledger".

In the present document, the term "web-of-trust" refers to a decentralized cryptographic model and related distributed system for relating in a reliable way a public key to a user, and by extension, considering a user identity as being reliable. In an embodiment of a web-of-trust of the present invention, a particular user identity is reliable if a sufficient number of user identities already belonging to the web-of-trust consider the particular user identity as being reliable. Hereby, said number can be considered as sufficiently large if it exceeds a predefined number. Related, the term Certificate Authority (CA) relates to an authority who maintains records regarding the user identity. Particularly, the CA may keep a record of the identity of each of a plurality of users by keeping track of at least the private key belonging to the user's key pair. This may involve maintaining certificates. While a web-of-trust and a certificate authority are clearly different, in the context of the present invention, they are alternative and interchangeable means for the verification of a user's identity, said verification preferably based on the knowledge of a user's public key.

"A", "an" and "the" refer in the document to both the singular and the plural form unless clearly understood differently in the context. "A blockchain" means for example one or more than one blockchain.

In a preferred embodiment, the file signature is built in exactly the same way as the renewed file signature. In an alternative embodiment, this is not the case; this is principally important because security standards evolve, and thus also the form of the file signature can evolve. It is thus conceivable that the renewed file signature has a longer identification string and/or a longer hash than the publisher-related file signature, because in the time between the original edition of the file and the renewal, one has opted for an increased security.

In a preferred embodiment, it is guaranteed by means of explicit provisions that the identification string is unique with respect to the blockchain. Moreover, in case of a file, this should preferably be guaranteed by the publisher. In an alternative embodiment, such measures are however not taken, for example because a sufficiently advanced hash function is used, as a result of which the risk of hash collision can be neglected. Even in such an alternative embodiment, problems with the uniqueness of the identification string can easily be avoided. A possibility is the use of said document-ID-pair. Another possibility is the inclusion, in the identification string of the file, next to the result of the hash function, of also another characteristic of the registration as a form of "supplementary hash". In a preferred embodiment, such a supplementary hash comprises a time stamp that relates to the present and a previous registration, preferably the first registration of the file in the blockchain. In a further preferred embodiment, the supplementary hash comprises data relating to any other characteristic of the present or a previous registration, such as a user identity. It should further be noted that an embodiment is even possible in which the identification string is only composed of the hash of the file and in which no checks are carried out as to the uniqueness of the hash. When using a sufficiently advanced hash function such as SHA-256, the risk of hash collision is indeed negligibly small. Should such a collision still exceptionally take place, then this hash collision can be easily detected by searching in the blockchain.

In an alternative embodiment, both a (default) hash and a supplementary hash is provided, in which the hash that is linked to a (default) hash function, and the supplementary hash that is linked to a supplementary hash function is different from said (default) hash function. Both hash functions are carried out on the file and thus lead to two different hashes, that are included in the identification string. As said above, the advantage of such a method is that it guarantees the security if one of both hash functions is compromised.

In a method of the present invention, the file signature comprises a user identity for retrieving the public key belonging to the user. In a preferred embodiment, the user identity comprises the actual public key. In an alternative embodiment, the user identity only comprises a key-related indication allowing a user to link a user identity to the public key. The user identity could for example comprise a user identification number, which is linked to one or more public keys such as said public key via a related aspect of the invention, for example by means of a web-of-trust and/or a Certificate Authority and/or a second blockchain or exactly the same said blockchain.

In a further preferred embodiment, said blockchain is publicly available. This has the additional advantage of an increased transparency. For users, it allows them to publicly provide the list of files that are signed by the user within the secure context of the present invention. For receivers and consumers of files, it provides a useful instrument for verifying the integrity, authenticity and non-repudiation of a particular file, without any restrictions as to the access to the blockchain.

In a further embodiment, said blockchain is the same for each of said plurality of users. This has the advantage that one single blockchain constitutes the reference for all signatures, with increased transparency for the users as a result. In an alternative embodiment, the file signatures are spread over more than one blockchain. This is for example possible in case the users are spread over different countries or continents, each attaching value and/or authority to a particular, possible mutually different blockchain. In such a case, the present invention can fully be applied.

In a further preferred embodiment, the file signature comprises said non-encrypted hash as obtained in step (b), i.e. the non-encrypted hash. This has the advantage that searches with respect to a file can be carried out in a very simple way, without having to know the user of the file and his public key.

In a further preferred embodiment, said registration in step (d) is realized provided that said user identity belongs to a plurality of user identities that have been registered in a web-of-trust and/or a Certificate Authority. This has the advantage that file signatures in the blockchain already comply with a certain quality mark when specifying them. This preferred embodiment is preferably associated with the use of a blockchain that is adapted for maintaining the validity of signatures of files, preferably PDF-based files, rather than a blockchain that has already been used for another aim such as the bitcoin blockchain.

In a preferred embodiment, said web-of-trust is at least partially registered in said blockchain. Such an embodiment has the advantage that no separate model should be used for the web-of-trust, which improves the simplicity. Moreover, the web-of-trust has in this way the known advantages of the blockchain, allowing irreversible, incontestable and distributed recording of the user identity related data, including timestamping.

In a further preferred embodiment, said file, for example a PDF document, comprises a document-ID-pair comprising a first document-ID and a second document-ID, in which the identification string determined in step (b) comprises said document-ID-pair, in which said document-ID-pair is unique with respect to the blockchain. This has the advantage that the document can be identified and retrieved by means of an identification that is comprised in the file itself, rather than to be external thereof, such as in the case of a hash. This has the advantage that the user disposing of only a file, is not required to provide for provisions to calculate a hash, and can also inquire the blockchain purely based on the document-ID-pair. The document-ID-pair can be determined at the first registration of the file in the blockchain, thus the first signing of the file in the blockchain.

In a further preferred embodiment, said private key is saved on a hardware security module (HSM) and/or smart card and/or USB token and/or similar device. This reduces the risk of theft of the private key.

In a preferred embodiment, a replacement of said key pair belonging to said user by a new key pair belonging to the same said user comprises a registration on said web-of-trust and/or said Certificate Authority. This has the advantage that said web-of-trust and/or said Certificate Authority can group the files of one and the same user under one and the same user identity, with larger simplicity as a result. In a preferred embodiment, it is thereby possible to sign existing files again with the new private key. This is essentially not necessary because the "obsolete" private key was valid at the time of signing. And since the blockchain records all data in an invariable way, the signature at that time remains a valid proof of signing. Legal regulation can however require that particular files are signed with a certain minimal encryption degree. Legal stipulations can also impose that there is always a signed version with a key that has not expired. Consequently, this is an additional reason why it can be useful to allow "re-signing" or "re-registering" of a file. In a preferred embodiment, it is moreover possible to apply, at such "re-signing", both a better hash function and a better algorithm for encryption of the hash. This occurs for example when a file signature is renewed as a result of an expired hash function, and, except for an improved hash function, a better encryption algorithm is also immediately applied. This shows a clear advantage of the renewal: the more recent the registration (either a first registration, or a renewal), the more reliable the file signing.

In a preferred embodiment, said blockchain at least partially overlaps with the technology of the bitcoin blockchain. This has the advantage that an existing system can be further developed. Because of the nature of the blockchain, in which data can be adjusted inappropriately only if some condition is fulfilled, e.g. if a majority of the calculation force represented in the nodes "conspires", it can be advantageous to make use of a similar large blockchain as the bitcoin blockchain. In a large blockchain, it is indeed very improbable that a majority of the calculation force is taken over by an attacker.

In a further preferred embodiment, said cryptographic hash function belongs to the family of Secure-Hash-Algorithms (SHA), more preferably SHA-256. The algorithm has the advantage that it has been proven and that efficient algorithms are available for carrying out hashing.

In a further preferred embodiment, said file signature comprises a supplementary hash that is different from said hash as obtained in step (b) and different from said signed hash. In a possible embodiment, said supplementary hash can be used for avoiding potential problems with hash collision, by using not only the hash as obtained in step (b), but the combination of this hash with the supplementary hash as a unique identification.

According to another preferred embodiment, said file signature comprises one or more signing-specific characteristics such as a status with respect to said file and/or said file signature. This has the advantage that the invention can be used in a more flexible way for various kinds of use.

In a further preferred embodiment of a system of the present invention, at least one of said plurality of devices comprises a hardware security module and/or smart card and/or USB token and/or similar device. This has the advantage that the risk of theft of the private key is limited.

In a further preferred embodiment of a system of the present invention, the fact that a user identity linked to a client application is compromised, leads to the removal of said compromised user identity from said plurality of user identities that have been registered in said web-of-trust and/or said Certificate Authority. This leads to a better organization of said web-of-trust and/or said Certificate Authority.

According to a further aspect of the invention, that is not intended to limit its scope in any way, the invention relates to following points 1-21.

1. Computer-implemented method for maintaining the validity of a file by two users, that are a receiver and a validating instance, said method comprising the sequential realization of the following set of steps for each of said plurality of users:
   (a) providing said file to the user;
   (b) searching a publisher-related file signature in a blockchain, said publisher-related file signature belonging to said file;
   (c) confirming a validity of said publisher-related file signature;
   (d) determining an identification string belonging to said file based on said file and/or optionally based on said publisher-related file signature;
   (e) establishing a renewed file signature based on at least both said identification string belonging to said file and a private key belonging to the user;
   (f) registering said renewed file signature in said blockchain;
   in which said publisher-related file signature comprises a publisher identity belonging to a publisher; in which said publisher is different of each of said two users; in which said confirmer of the validity in step (c) comprises determining the validity of said publisher identity; in which said renewed file signature at least allows to identify said file in a unique way with respect to the blockchain; in which said establishing in step (e) comprises encrypting said identification string by means of said private key belonging to a pair key belonging to said user for obtaining a signed identification string, said key pair comprising said private key and a public key; in which said renewed file signature comprises said signed identification string; in which said renewed file signature comprises a user identity for finding said public key; and in which said maintaining is as soon as step (f) has been carried out for each user.

2. Method of the previous point 1, characterized in that said sequential realization of said set of steps for a first of said two users constitutes a trigger for sequentially carrying out said set of steps for a second of said two users.

3. Method of the previous point 2, characterized in that said registration in step (f) is realized provided that said user identity belonging to said user and said user identity belonging to said validating instance, belong to a plurality of user identities that have been registered in a web-of-trust.

4. Method of the previous point 3, characterized in that said registration in step (f) is realized further provided that said user identity belonging to said validating instance meet the additional criterion as to reliability.

5. Method of any one of the previous points 1 to 4, characterized in that said file is a PDF-based document, preferably a PDF document (Portable Document Format).

6. Method of any one of the previous points 1 to 5, characterized in that said determination in step (b) comprises the calculation of a hash from said file by means of a cryptographic hash function, in which said identification string is determined based on at least said hash.

7. Method of any of the previous points 1 to 6, characterized in that said blockchain is publicly accessible.

8. Method of any of the previous points 1 to 7, characterized in that said blockchain is the same for each of said plurality of users.

9. Method of any one of the previous points 6 to 8, characterized in that said file signatures comprises said non-encrypted hash as obtained in step (d).

10. Method of any one of the previous points 1 to 9, characterized in that said file comprises a document-ID-pair comprising a first document-ID and a second document-ID, in which the identification string determined in step (d) comprises said document-ID-pair, in which said document-ID-pair is unique with respect to the blockchain.

11. Method of any of the previous points 1 to 10, characterized in that said private key is saved on a hardware security module (HSM) and/or smart card and/or USB token.

12. Method of any one of the previous points 3 to 11, characterized in that a replacement of said key pair belonging to said user by a new key pair belonging to the same said user comprises a registration on said web-of-trust.

13. Method of any one of the previous points 1 to 12, characterized in that said blockchain overlaps at least partially with the technology of the bitcoin blockchain.

14. Method of any one of the previous points 6 to 13, characterized in that said cryptographic hash function belongs to the family of Secure-Hash-Algorithms (SHA).

15. Method of any of the previous points 6 to 14, characterized in that said file signature comprises a supplementary hash that is different from said hash as obtained in step (b) and different from said signed hash.

16. Method of any one of the previous points 1 to 15, characterized in that said file signature comprises one or more signing-specific characteristics such as a status with respect to said file and/or said file signature.

17. System for maintaining the validity of a file by a plurality of users, said system comprising a plurality of mutually linked devices belonging to said plurality of users, each of the devices comprising a processor, tangible non-volatile memory, instructions in said memory for controlling said processor, a client application, in which for each device, the client application is configured for carrying out a method of any one of the previous points 1 to 16, in which a user identity for retrieving the public key for at least one of the users is linked one-to-one to the client application on the device belonging to said user.

18. System of point 17, characterized in that at least one of said plurality of devices comprises a hardware security module and/or smart card and/or USB token.

19. System of any one of the previous points 17 and 18, characterized in that a registration of a file signature in a blockchain takes place provided that said user identity belongs to a plurality of user identities that have been registered in a web-of-trust; and that the fact that the user identity linked to the client application is compromised, leads to the removal of said compromised user identity from said plurality of user identities that have been registered in said web-of-trust.

20. Use of the method of any of the points 1 to 16 in the system of any of the points 17 to 19.

21. Computer program for carrying out a computer-implemented method for maintaining the validity of a file by a plurality of users of any one of the previous points 1 to 16, which computer program product comprises at least one readable medium in which computer-readable program code portions are saved, which program code portions comprise instructions for carrying out said method.

In the following, the present invention is described based on the following non-limiting examples, for illustrating the invention in a particular embodiment.

EXAMPLE 1

Decentralized Method and Decentralized System

This example supposes a system of the present invention. The system comprises a plurality of said devices, called SYSTEM entities here, that are mutually connected via a network such as the internet. Each SYSTEM entity comprises a CLIENT component and an HSM. The CLIENT component corresponds to said client application and can for example be built in a document management system that is available on the SYSTEM entity and/or a web browser that is available on the SYSTEM entity. The user identity, called IDENTITY specification here, is used to identify the person or the company that possesses the CLIENT component, the HSM and the SYSTEM entity. Said web-of-trust comprises each IDENTITY specification. A new IDENTITY specification is only trusted if it presents itself at the web-of-trust and is approved by a sufficient number of other IDENTITY specifications that are present on the web-of-trust, such as companies that know and trust each other. The web-of-trust is for example used when an HSM must be replaced or when the key pair on the HSM has expired, or because the encryption-algorithm used in combination with the key pair must be updated.

Each CLIENT component maintains a copy of the BLOCKCHAIN database composed of blocks, corresponding to said blockchain. Each block in the BLOCKCHAIN database comprises a list of said document-ID-pairs, said signed hashes of the PDF files, and information about the user comprised in the user identity. The BLOCKCHAIN database itself is public, and doesn't give access to the content of files. As to the possible distribution of files, it is the SYSTEM entity that entirely decides. The signed hash is hereby called SIGNATURE, and is registered in combination with the document-ID-pair and the IDENTITY specification in the BLOCKCHAIN database. Hereby, the combination of SIGNATURE, document-ID-pair and IDENTITY specification corresponds to said file signature.

In this exemplary embodiment, the combination of document-ID-pair, SIGNATURE and IDENTITY specification is a unique and irrevocable proof of the existence of said file at a particular time. The registration of this combination in the blockchain as a result of a signature thus leads to the specification of the content of the file, and the creation of a link between the user who signs and the relevant file. Hereby, it is about both the publisher-related file signature and the renewed file signature.

At each signature, it is checked if all notifications in the blockchain for the same file are valid. This must be the case, as the CLIENT application would not allow to add a corrupt SIGNATURE. In a preferred embodiment, the corresponding system comprises provisions prohibiting that signatures are made in the BLOCKCHAIN database with an IDENTITY specification which is known to be compromised, and already recorded signatures with corrupt SIGNATURE are marked as invalid. In a preferred embodiment, the existing invalid SIGNATURE is overruled by a new SIGNATURE, for which the private key is registered via the web-of-trust.

In a preferred embodiment, the method of the present invention is used to renew a file that is a kind of contract between both parties. In such a case, the publisher of the file is the first party, and he registers the first renewed file signature in the BLOCKCHAIN. The second party registers a second renewed file signature in the BLOCKCHAIN for the same file, and thus confirms that the contract remains valid.

It will be understood that the present invention is not limited to the embodiments described above and that some adjustments or changes can be added to the described examples without changing the scope of the enclosed claims. The present invention has for example been described referring to a separate blockchain destined for signed registration of PDF files, but it will be clear that the invention can be applied with a blockchain that is acquainted with another use, such as for example the bitcoin blockchain.

EXAMPLE 2

JSON Document with Study Results

In a specific example of the present invention, the file is a JSON document (JavaScript Object Notation). The publisher is a first training instance such as a university, assigning study results to a receiver, that is, a student. The results are assigned within the framework of a training, for example a bachelor training. The file comprises portions of JSON code in which the different subjects taken are listed, with each time a number of credits (for example ECTS credits) and a score. The file is registered in the blockchain with an publisher-related file signature and, preferably, is signed at that moment by the receiver of the study results. The student wants to submit these study points many years later to a second institute of education in another country to obtain a master degree. This master degree can only be obtained after submitting a proof of an earlier bachelor training that has been followed. Said file is part of this proof. The original publisher-related signature of the file should however be renewed, for example because of said reasons (01), (02) and/or (03). The student contacts the first institute of education, but is not heard. Subsequently, the student contacts a validating instance such as the authority of the country under which said first institute of education falls, via the web-of-trust and/or the Certificate Authority in which he himself is registered. This validating instance also signs for the renewed signature of the file in the blockchain, as a result of which the validity of the file is maintained.

Thanks to this new signature, the file is a valid proof of a bachelor training that has been followed. This proof can be submitted (whether or not combined with further proof) to said second institute of education.

EXAMPLE 3

Registration of Will

In this example related to the present invention, the file for which the validity is maintained is a digital document concerning a last will or testament of a person with one or more heirs, together with the location of said document. While alive, the person registers the document in the blockchain, whereby said registration may be kept valid over time by means of the present invention by e.g. a notary or an heir. The document itself, however, remains secret as long as the person is alive and is not available to the heirs or the notary. The document itself is stored securely in a document vault, and protected with a security mechanism known to the skilled person, such as e.g. the Ethereum wallet. The document vault may be protected according to a strong security criterion based on a plurality of keys. For instance, the document vault may comprise a registration of keys, one for each heir and one for the notary. Hereby, the document can only leave the vault and become accessible if at least a certain number of keys is entered, e.g. 2 (the key of the notary and the key of one of the heirs), or 3 (the key of the notary and the key of two of the heirs), or all (the key of the notary and the key of all of the heirs).

The invention claimed is:

1. Computer-implemented method for maintaining a validity of a file by plural users, that are a receiver and a validating instance, said method comprising a sequential realization of the following set of steps for each of said plural users:

(a) providing said file to a user;

(b) searching a publisher-related file signature in a blockchain, said publisher-related file signature belonging to said file and comprising a publisher identity belonging to a publisher, in which said publisher identity is different for each of said plural users;

(c) confirming a validity of said publisher-related file signature and determining the validity of said publisher identity;

(d) determining an identification string belonging to said file based on said file and based on said publisher-related file signature compromising the step of calculating a hash from said file by a cryptographic hash function, in which said identification string is determined based on at least said hash;

(e) establishing a renewed file signature based on at least both said identification string belonging to said file and a private key of a key pair belonging to the user, said key pair comprising said private key and a public key; wherein said identification string is encrypted by means of said private key, and wherein said renewed file signature comprises said signed identification string; and (f) registering said renewed file signature in said blockchain;

wherein said establishing the renewed file signature in step (e) at least allows identifying said file in a unique way with respect to the blockchain; wherein said renewed file signature is obtained by a different hash function, a different key pair, or a different technology for signing than previously utilized for said file; and in which said maintaining is done as soon as step (f) has been carried out for each of said plural users.

2. Method of claim 1, wherein said sequential realization of said set of steps for a first of said users constitutes a trigger for sequentially carrying out said set of steps for a second of said users.

3. Method of claim 2, wherein registration in step (f) is realized provided that said user identity belonging to said user and said user identity belonging to said validating instance, belong to plural user identities that have been registered in a web-of-trust and/or a Certificate Authority.

4. Method of claim 3, wherein said registration in step (f) is realized further provided that said user identity belonging to said validating instance meet the additional criterion as to reliability.

5. Method of claim 1, wherein said file is a PDF-based document, or a PDF document (Portable Document Format).

6. Method of claim 1, wherein said blockchain is publicly accessible.

7. Method of claim 1, wherein said blockchain is the same for each of said users.

8. Method of claim 1, wherein said file signatures comprises a non-encrypted hash as obtained in step (d).

9. Method of claim 1, wherein said file comprises a document-ID-pair comprising a first document-ID and a second document-ID, in which the identification string determined in step (d) comprises said document-ID-pair, in which said document-ID-pair is unique with respect to the blockchain.

10. Method of claim 1, wherein said private key is saved on a hardware security module (HSM), a smart card or USB token.

11. Method of claim 3, wherein a replacement of said key pair belonging to said user by a new key pair belonging to the same said user comprises a registration on said web-of-trust and/or said Certificate Authority.

12. Method of claim 1, wherein said blockchain overlaps at least partially with the technology of a bitcoin blockchain.

13. Method of claim 1, wherein said cryptographic hash function belongs to a family of Secure-Hash-Algorithms (SHA).

14. Method of claim 1, wherein said renewed file signature comprises a supplementary hash that is different from said hash as obtained in step (d) and different from a signed hash.

15. Method of claim 1, wherein said file signature comprises one or more signing-specific characteristics such as a status with respect to said file or said file signature.

16. System for maintaining the validity of a file by plural users, said system comprising plural mutually linked devices belonging to said plural users, each of the devices comprising a processor, tangible non-volatile memory, instructions in said memory for controlling said processor, a client application, in which for each device, the client application is configured for carrying out a method of claim 1, in which said user identity for retrieving the public key for at least one of the users is linked one-to-one to the client application on the device belonging to said user.

17. System of claim 16, wherein at least one of said devices comprises a hardware security module or smart card or USB token.

18. System of claim 16, wherein a registration of a file signature in a blockchain takes place provided that said user identity belongs to user identities that have been registered in a web-of-trust and/or with a Certificate Authority; and that the fact that the user identity linked to the client application is compromised, leads to the removal of said compromised user identity from said plural user identities that have been registered in said web-of-trust and/or with said Certificate Authority.

19. Computer program product for carrying out a computer-implemented method for maintaining the validity of a file by the plural users of claim 1, which computer program product comprises at least one non-transitory readable medium in which computer-readable program code portions are saved, which program code portions comprise instructions for carrying out said method.

* * * * *